US012731455B2

(12) United States Patent
Ludwick et al.

(10) Patent No.: US 12,731,455 B2
(45) Date of Patent: *Sep. 8, 2026

(54) ELECTRONIC GAME SYSTEMS AND METHODS WITH A METAMORPHIC FEATURE

(71) Applicant: Aristocrat Technologies, Inc., Las Vegas, NV (US)

(72) Inventors: John Ludwick, Reno, NV (US); Allon Englman, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/374,418

(22) Filed: Sep. 28, 2023

(65) Prior Publication Data

US 2024/0029502 A1 Jan. 25, 2024

Related U.S. Application Data

(63) Continuation of application No. 17/473,518, filed on Sep. 13, 2021, now Pat. No. 11,823,523.

(60) Provisional application No. 63/078,483, filed on Sep. 15, 2020.

(51) Int. Cl.
*G07F 17/32* (2006.01)
*G07F 17/34* (2006.01)

(52) U.S. Cl.
CPC .......... *G07F 17/3213* (2013.01); *G07F 17/34* (2013.01)

(58) Field of Classification Search
CPC ............................. G07F 17/3213; G07F 17/34
USPC ........................................................... 463/20
See application file for complete search history.

(56) References Cited

U.S. PATENT DOCUMENTS 7,381,133 B2 6/2008 Thomas
2004/0142740 A1 7/2004 Damico
2006/0025215 A1 2/2006 Thomas
2007/0202943 A1 8/2007 Thomas
2008/0096625 A1* 4/2008 Thomas .................. G07F 17/34 463/13
2010/0029381 A1 2/2010 Vancura (Continued)

OTHER PUBLICATIONS

Office Action (Non-Final Rejection) dated Feb. 15, 2023 for U.S. Appl. No. 17/473,518 (pp. 1-7).

(Continued)

*Primary Examiner* — Ryan Hsu
(74) *Attorney, Agent, or Firm* — Armstrong Teasdale LLP

(57) ABSTRACT

An electronic gaming machine (EGM) that uses a feature symbol set and plurality of reel sets, where each feature symbol defines an inactive feature symbol and an activated feature symbol, and where each reel set includes reels that use an activated feature symbol. The EGM identifies a selected reel set that includes an activated feature symbol and initiates a spin. The EGM cause first and second reels to stop spinning and, in response to determining that at least one first activated symbol appears on each of the first and second reels, triggers a feature causing one or more overlay symbols with prize identifiers to be overlaid onto a play area. The EGM stop the spinning of the other reels, evaluates an outcome of the spin that includes at least one overlay symbol with an associated prize identifier, and awards a prize indicated by the prize identifier based on the evaluation.

20 Claims, 17 Drawing Sheets

(56) References Cited

U.S. PATENT DOCUMENTS

| | | | |
|---|---|---|---|
| 2010/0190544 A1 | 7/2010 | Thomas | |
| 2010/0255900 A1 | 10/2010 | Ansari | |
| 2011/0105218 A1 | 5/2011 | Anderson | |
| 2014/0094274 A1 | 4/2014 | Guinn | |
| 2018/0102020 A1* | 4/2018 | You | G07F 17/3267 |
| 2019/0355206 A1 | 11/2019 | Kania | |
| 2020/0279451 A1 | 9/2020 | La Guardia | |
| 2020/0312087 A1 | 10/2020 | Kendall | |
| 2021/0256811 A1 | 8/2021 | Ma | |

OTHER PUBLICATIONS

Office Action (Notice of Allowance and Fees Due (PTOL-85)) dated Jul. 12, 2023 for U.S. Appl. No. 17/473,518 (pp. 1-9).

* cited by examiner

FIG. 5A
510
402
GRAND
$10,000.00
MAJOR
$50.00
$500.00
$50.00
CHOOSE YOUR FREE GAMES
15
FREE GAMES
3-3-4-4-4
REELS
576
WAYS
10
FREE GAMES
3-3-5-5-5
REELS
1125
WAYS
FREE GAMES
3-3-6-6-6
REELS
1944
WAYS

FIG. 6
600
402
GRAND
$10,000.00
MAJOR
$50.00
$500.00
$50.00
CHOOSE YOUR FREE GAMES
10
FREE GAMES
WITH
BIGGER
CASH
VALUES
3
GOLD SPINS
GUARANTEED
GOLD WIN ON
EVERY SPIN
AND BIGGER
CASH VALUES

ELECTRONIC GAME SYSTEMS AND METHODS WITH A METAMORPHIC FEATURE

CROSS-REFERENCE TO RELATED APPLICATIONS

This application is a continuation of, and claims the benefit of priority to U.S. patent application Ser. No. 17/473,518, filed 13 Sep. 2021, entitled "ELECTRONIC GAME SYSTEMS AND METHODS WITH A METAMORPHIC FEATURE which claims the benefit of priority to U.S. Provisional Patent Application No. 63/078,483, filed 15 Sep. 2020, entitled "ELECTRONIC GAME SYSTEMS AND METHODS WITH A METAMORPHIC FEATURE," the entire contents and disclosures of which are hereby incorporated herein by reference in their entirety.

TECHNICAL FIELD

The field of disclosure relates generally to electronic gaming, and more particularly to electronic gaming systems and methods with a metamorphic feature.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

In one aspect, an electronic gaming machine (EGM) is provided. The EGM includes at least one display device configured to display an electronic game that includes an overlay feature. The EGM also includes a memory storing a feature symbol set and plurality of reel sets, the feature symbol set includes a plurality of feature symbols, each feature symbol of the plurality of feature symbols defines at least an inactive feature symbol and an activated feature symbol, each reel set of the plurality of reel sets includes a plurality of reels that use at least one activated feature symbol of the feature symbol set and inactive feature symbols for any remaining feature symbols of the feature symbol set. The EGM also includes a game controller configured to execute instructions stored in at least one memory that, when executed, cause the game controller to at least: (i) identify a selected reel set of the plurality of reel sets for a spin of a base game based on an output of a random number generator, the selected reel set includes a first activated feature symbol; (ii) initiate a spin of the electronic game using the selected reel set; (iii) cause a first reel and a second reel of the selected reel set to stop spinning; (iv) in response to determining that at least one first activated symbol appears on each of the first and second reels, trigger a feature causing one or more overlay symbols to be overlaid onto one or more symbol positions of a play area, each overlay symbol of the one or more overlay symbols includes the first activated feature symbol and a prize identifier; (v) stop the spinning of the other reels of the selected reel set; (vi) evaluate an outcome of the spin that includes at least one overlay symbol with an associated prize identifier; and (vii) award a prize indicated by the prize identifier based on the evaluation.

In another aspect, a method of providing an electronic game with an overlay feature is provided. The method is performed using an electronic gaming device having at least one processor, at least one display device configured to display the electronic game, and a memory storing a feature symbol set and a reel set, the feature symbol set includes a plurality of feature symbols, each feature symbol of the plurality of feature symbols defines at least an inactive feature symbol and an activated feature symbol. The method includes selecting one of the feature symbols from the feature symbol set based on an output of a random number generator. The method also includes replacing, on one or more reels of the reel set, the inactive symbols of the selected feature symbol with the activated symbol associated with the selected feature symbol. The method further includes initiating a spin of the electronic game using a plurality of reels of the reel set. The method also includes causing a first reel and a second reel of the selected reel set to stop spinning. The method further includes, in response to determining that at least one first activated symbol appears on each of the first and second reels, triggering a feature causing one or more overlay symbols to be overlaid onto one or more symbol positions of a play area, each overlay symbol of the one or more overlay symbols includes the selected feature symbol and a prize identifier. The method also includes stopping the spinning of the other reels of the reel set. The method further includes evaluating an outcome of the spin that includes at least one overlay symbol with an associated prize identifier. The method also includes awarding a prize indicated by the prize identifier based on the evaluation.

In yet another aspect, a non-transitory computer readable medium storing instructions is provided. When executed by at least one processor, the instructions cause the at least one processor to: (i) identify a selected reel set of a plurality of reel sets for a spin of an electronic game based on an output of a random number generator, the electronic game includes a feature symbol set and plurality of reel sets, the feature symbol set includes a plurality of feature symbols, each feature symbol of the plurality of feature symbols defines at least an inactive feature symbol and an activated feature symbol, each reel set of the plurality of reel sets includes a plurality of reels that use at least one activated feature symbol of the feature symbol set and inactive feature symbols for any remaining feature symbols of the feature symbol set, the selected reel set includes a first activated feature symbol; (ii) initiate a spin of the electronic game using the selected reel set; (iii) cause a first reel and a second reel of the selected reel set to stop spinning; (iv) in response to determining that at least one first activated symbol appears on each of the first and second reels, trigger a feature causing one or more overlay symbols to be overlaid onto one or more symbol positions of a play area, each overlay symbol of the one or more overlay symbols includes the first activated feature symbol and a prize identifier; (v) stop the spinning of the other reels of the selected reel set; (vi) evaluate an outcome of the spin that includes at least one overlay symbol with an associated prize identifier; and (vii) award a prize indicated by the prize identifier based on the evaluation.

DETAILED DESCRIPTION

Electronic gaming devices, systems and methods are described herein that provide a metamorphic feature in an electronic game. An electronic gaming device (EGM) may initiate a metamorphic feature during base game play. The metamorphic feature includes a set of feature symbols ("feature symbol set") that appear on the reels, initially in an inactive state. During an initial reel spin of the base game, one or more of the symbols from the morphing symbol set may be selected and activated for that spin. The selected symbol is changed on the reels to an activated form (e.g., to a "gold" appearance, or some other distinguishing visual change) to signify activation of that particular symbol for this feature. The player sees when any particular symbol is activated, for example, as the gold symbols appear on the spinning reels. The EGM spins and stops reels one and two (e.g., from the left in a left-to-right evaluation configuration) and the EGM may trigger the metamorphic feature based on, for example, whether any of the activated symbols appears on reels one and two. In some evaluations, the metamorphic feature includes an animation indicating a change to a metamorphic display component (e.g., a staging animation, such as a coin being added to a bowl of coins). In some evaluations, the metamorphic feature is triggered to activate and affect the outcomes on the remaining reels as they continue to spin, and may include a metamorphic feature activation animation (e.g., coins falling from the bowl onto the reels). In the example embodiment, the metamorphic feature activation includes adding cash-on-reels symbols onto positions of the play area on reels 3, 4, and 5 (e.g., as overlay symbols masking any underlying symbol on the reel when that reel is stopped). In some embodiments, this metamorphic feature is provided during bonus game play, and the player may be allowed to choose aspects of bonus game play with respect to number of free spins and reel heights (e.g., with options to have more free spins but a smaller sized play area or less free spins but with a larger sized play area).

Figure 1:
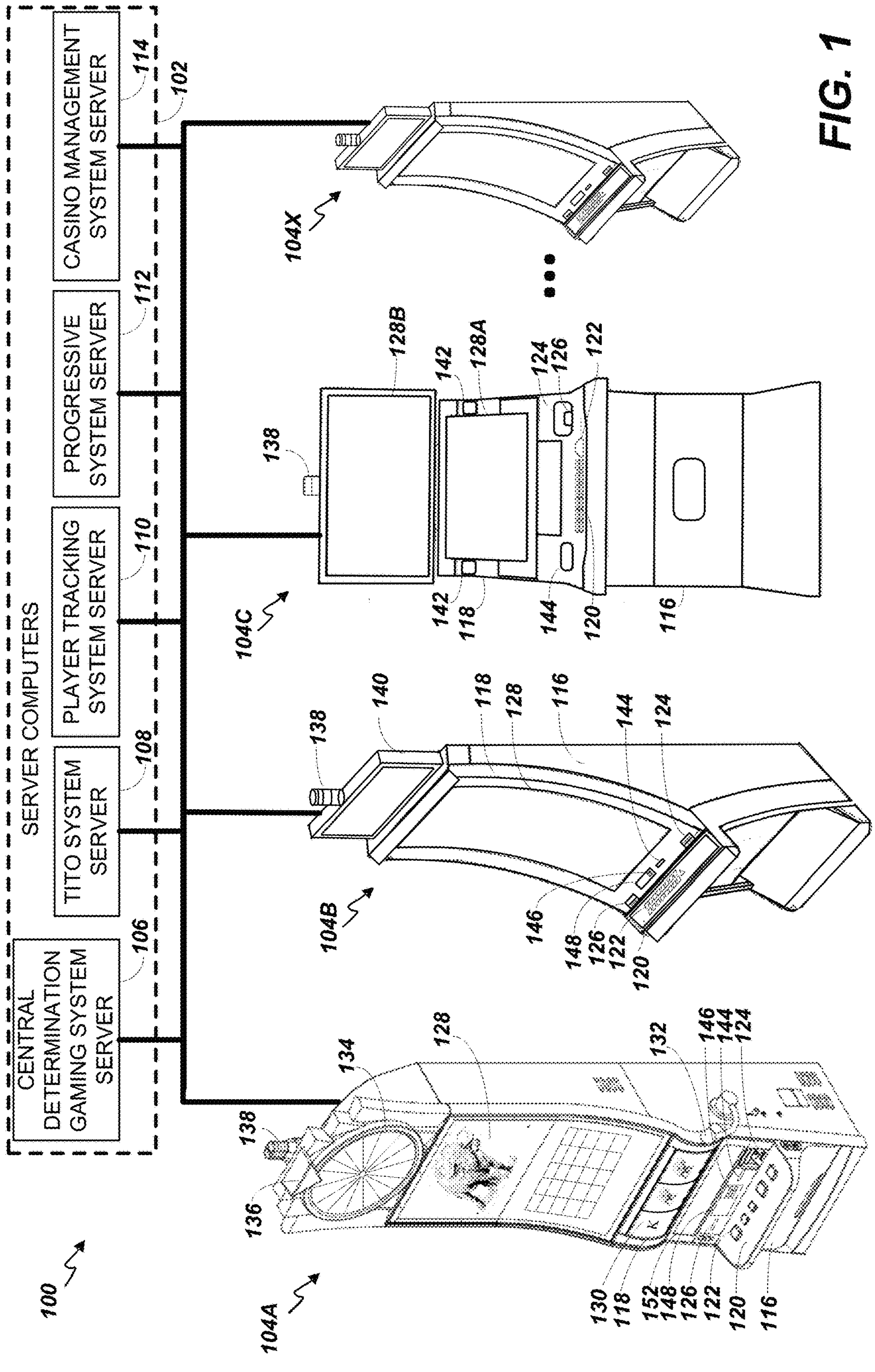
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards. Additionally, or alternatively, one or more of gaming devices 104A-104X may be configured as a tabletop game, as shown below in FIG. 4.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a web site maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
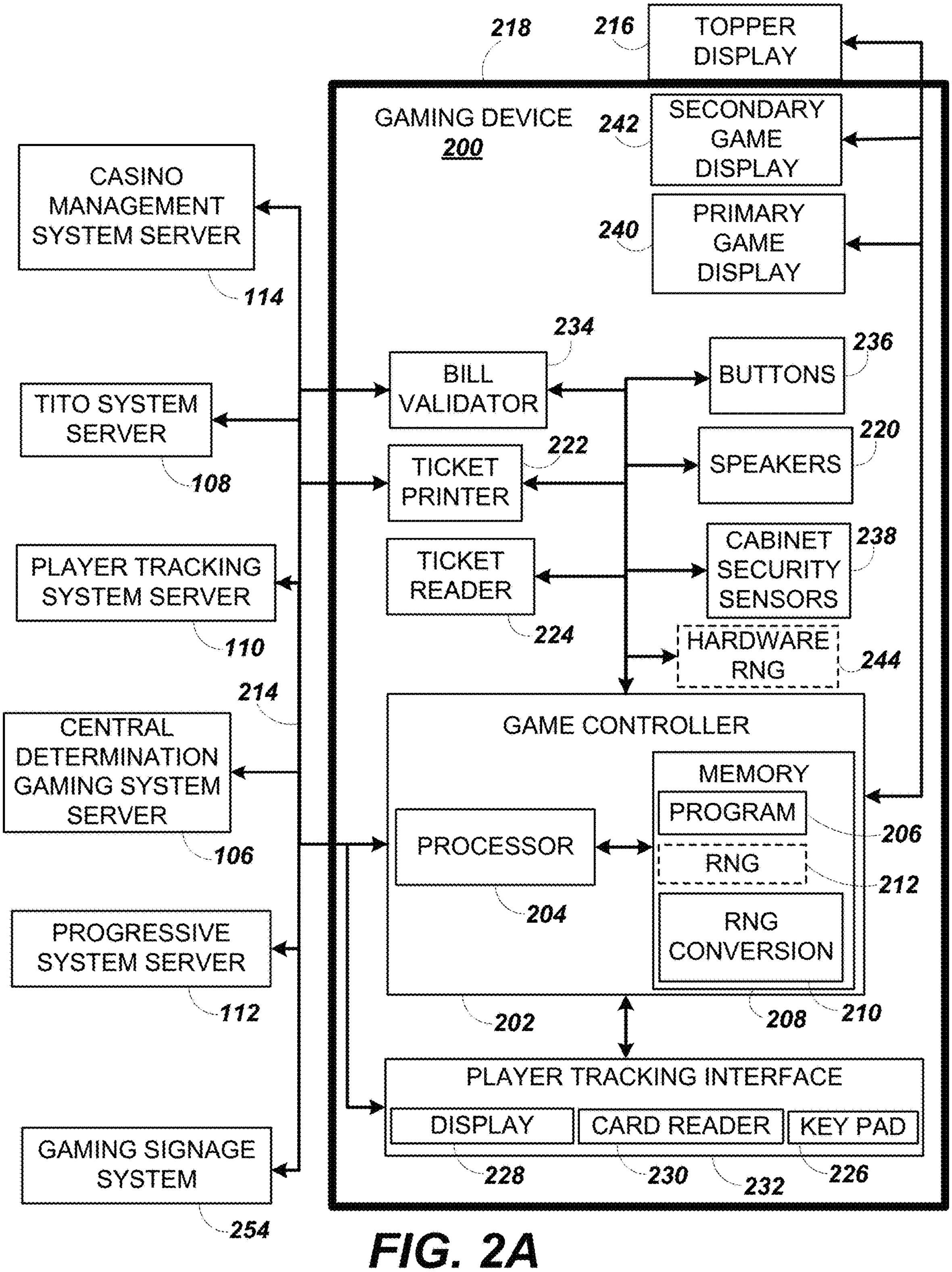
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Although gaming devices 104A-104X are shown in FIG. 1 as upright EGMs, the systems and methods described herein can be used on upright EGMs or table type EGMs as shown in FIG. 4.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

In an example embodiment, a tabletop EGM (not shown in FIG. 1) is provided which may be similar to the gaming devices 104. The tabletop EGM may include a horizontal display device that can be used by patrons as a conventional table surface as well as for providing player input (e.g., touchscreen surface, mechanical buttons, or the like) and display output (e.g., virtual wheel, virtual slot reels) for a tabletop game. The tabletop EGM may support participation for multiple players during game play (e.g., as patrons socially meet around the tabletop EGM). Example tabletop EGMs and features are described in greater detail below.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS ° system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
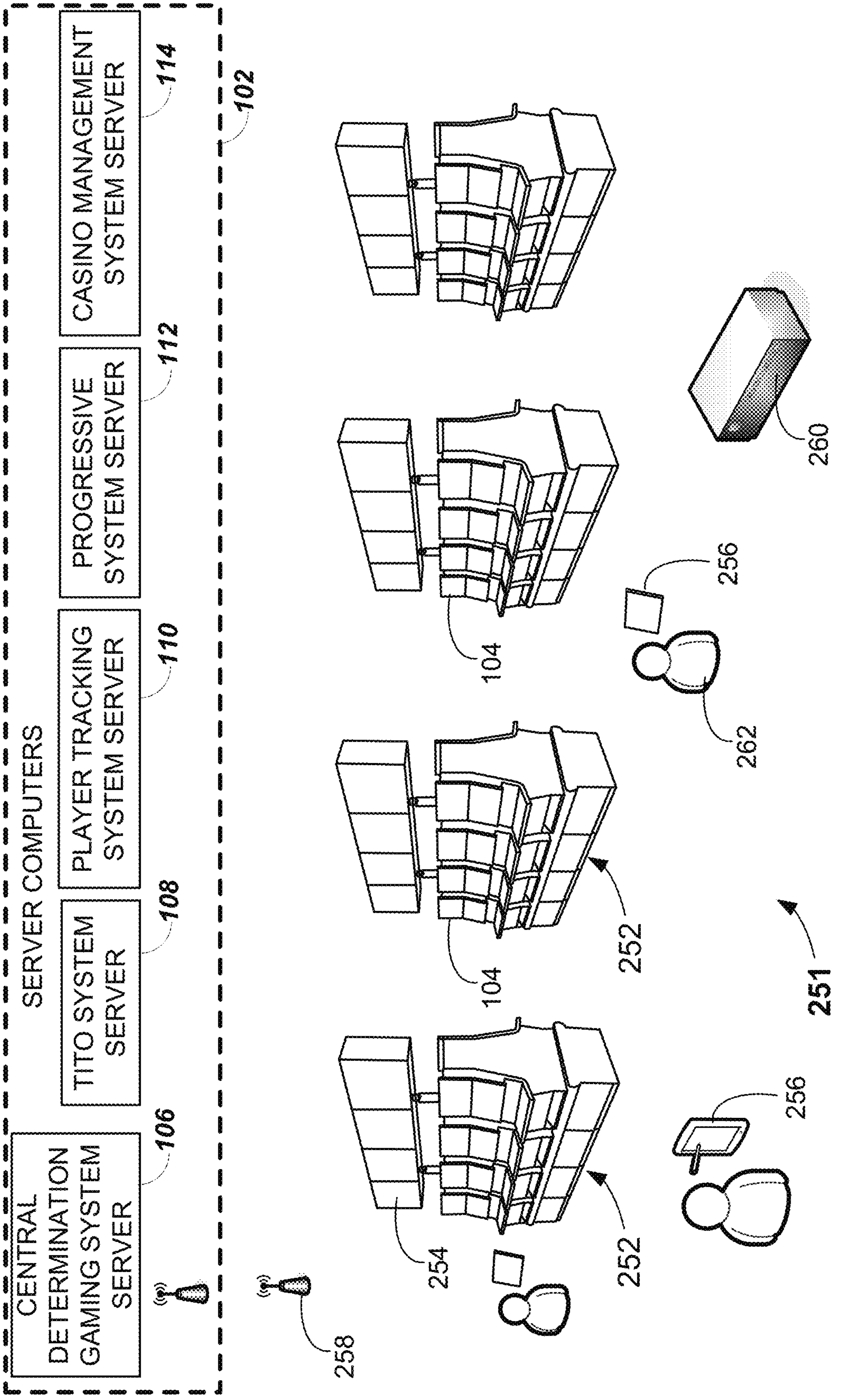
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
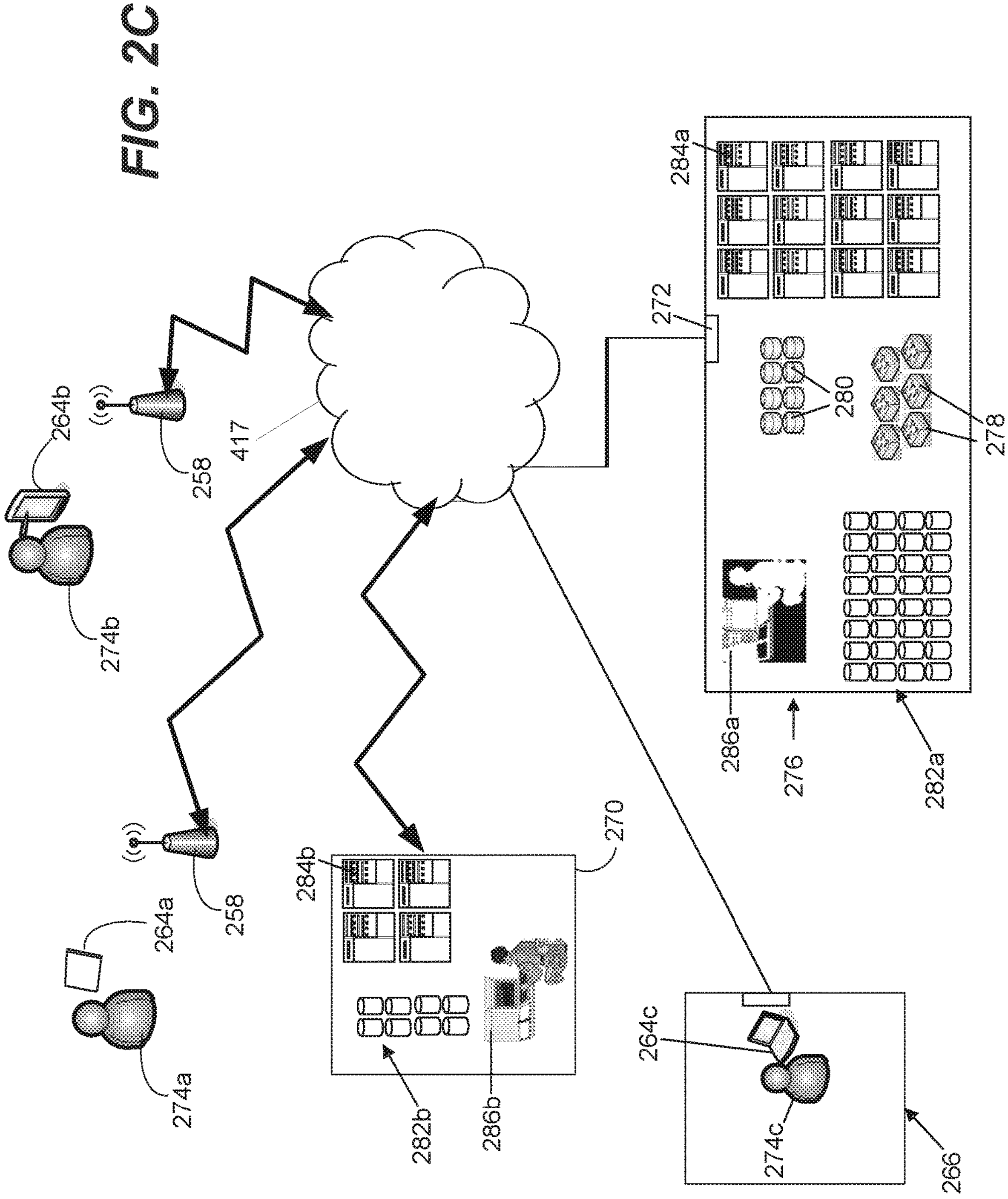
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
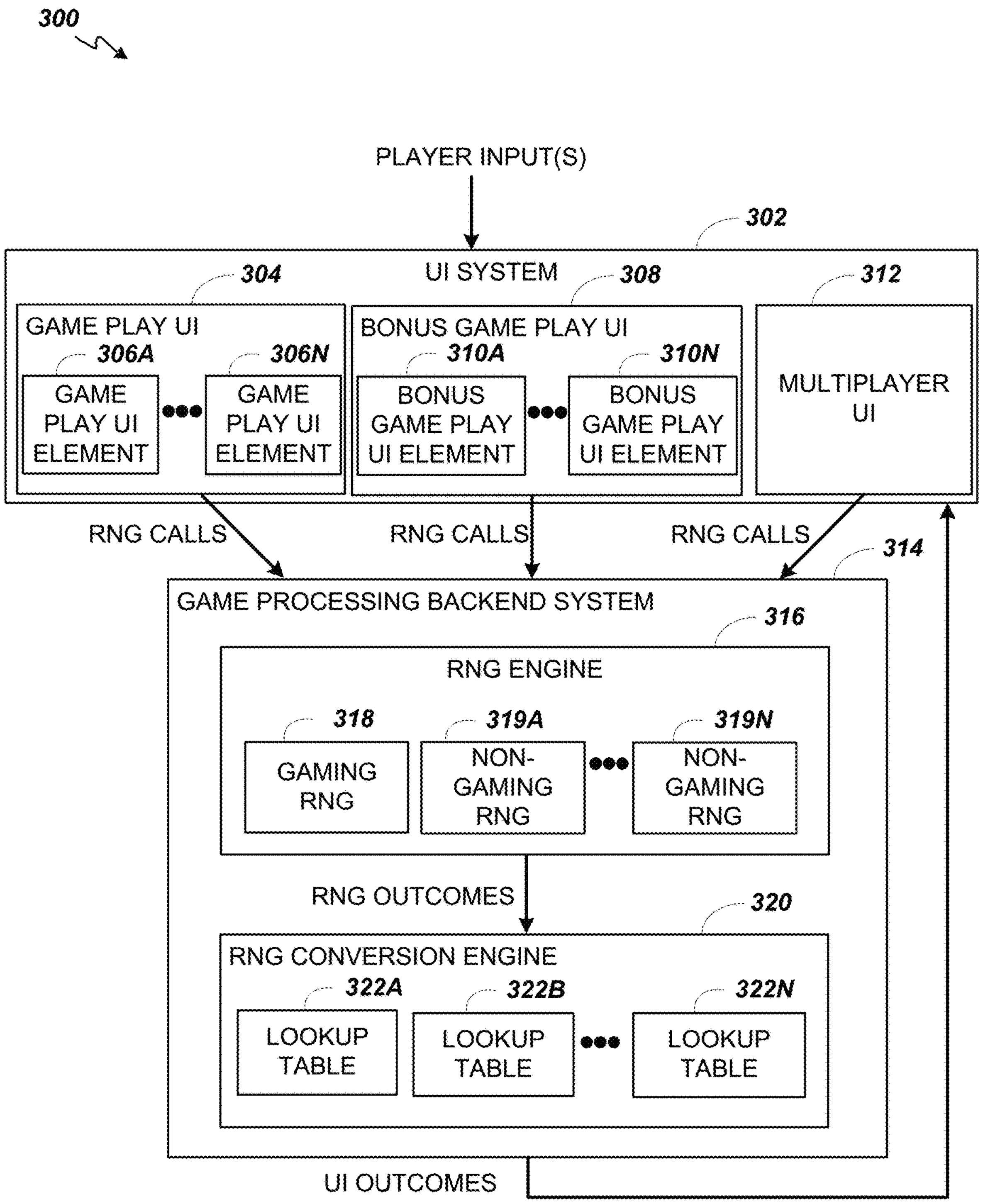
FIG. 3 illustrates, in block diagram form, an embodiment of a game processing architecture algorithm that implements a game processing pipeline for the play of a game in accordance with various embodiments described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4A:
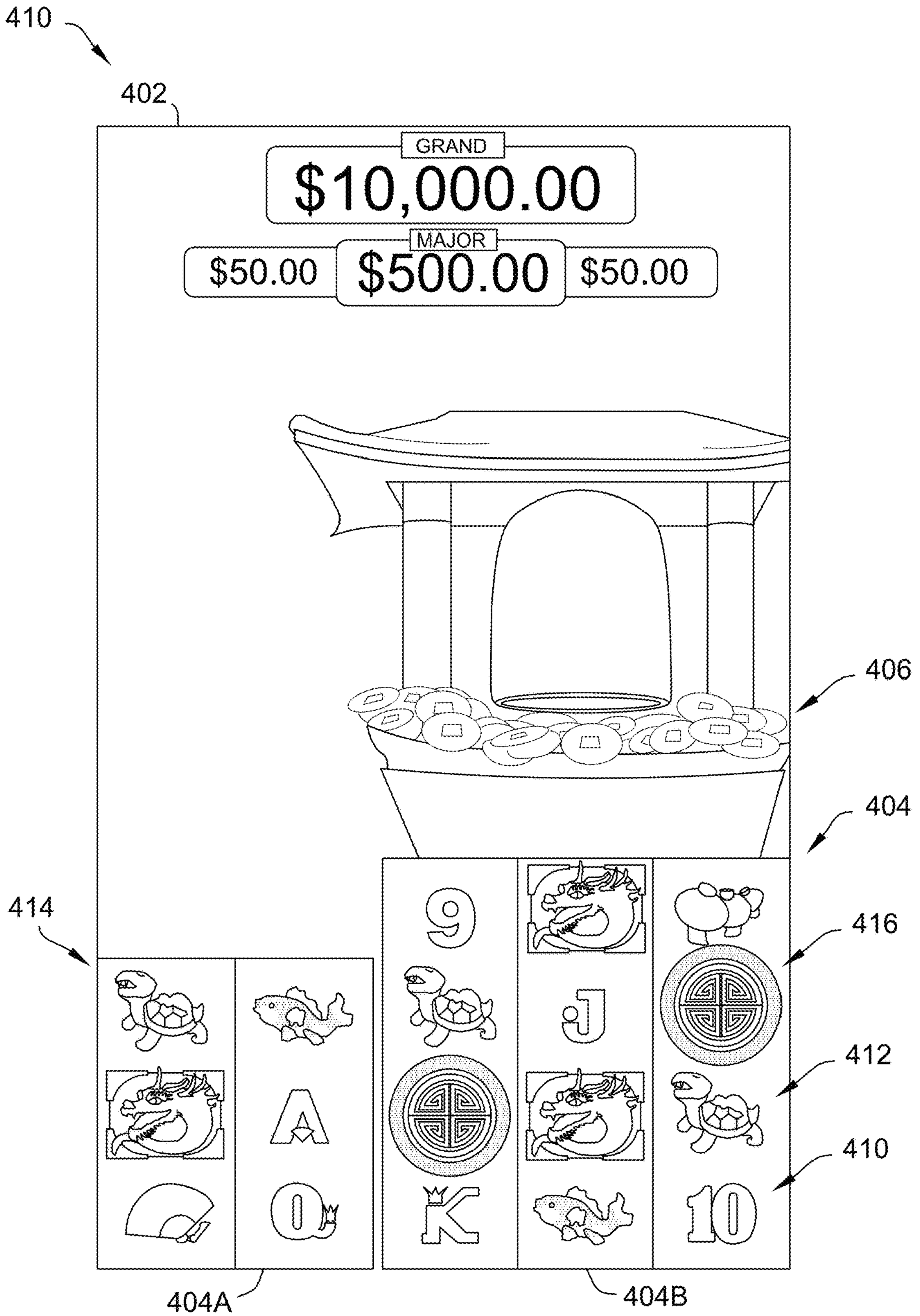
FIGS. 4A-4D illustrate example screenshots of a metamorphic feature of an electronic game provided as a feature of a reel-based base game that may be provided by the EGMs shown in FIGS. 1-3.

FIGS. 4A-4D illustrate example screenshots 410, 420, 430, 440 of a metamorphic feature of an electronic game provided as a feature of a reel-based base game that may be provided by the EGMs 104, 200 shown in FIGS. 1-3. FIG. 4A illustrates an example embodiment in which the electronic game is a slot-style reel game that utilizes virtual reels, spinning and stopping those reels during base game play and evaluating the outcome of the spin (e.g., in a "ways" evaluation, a pay line evaluation, or the like). In the example shown here, the electronic game is presented via a graphical user interface 402 (e.g., on one or more display devices of game device 200), which displays a play area 404 in a 3-3-4-4-4 configuration (in left-to-right nomenclature). The two left-most reels present three symbol positions and the three right-most reels present four symbol positions, but other reel size configurations are possible. The play area 404 includes both a triggering play area 404A (e.g., the left-most two reels) which may be used to trigger the metamorphic feature, as well as a metamorphic target play area 404B (e.g., the right-most three reels) which may be affected by the metamorphic feature in various ways. The electronic game also provides metamorphic display component 406 (e.g., a bowl of gold coins) positioned above the metamorphic target play area 404B.

Figure 7:
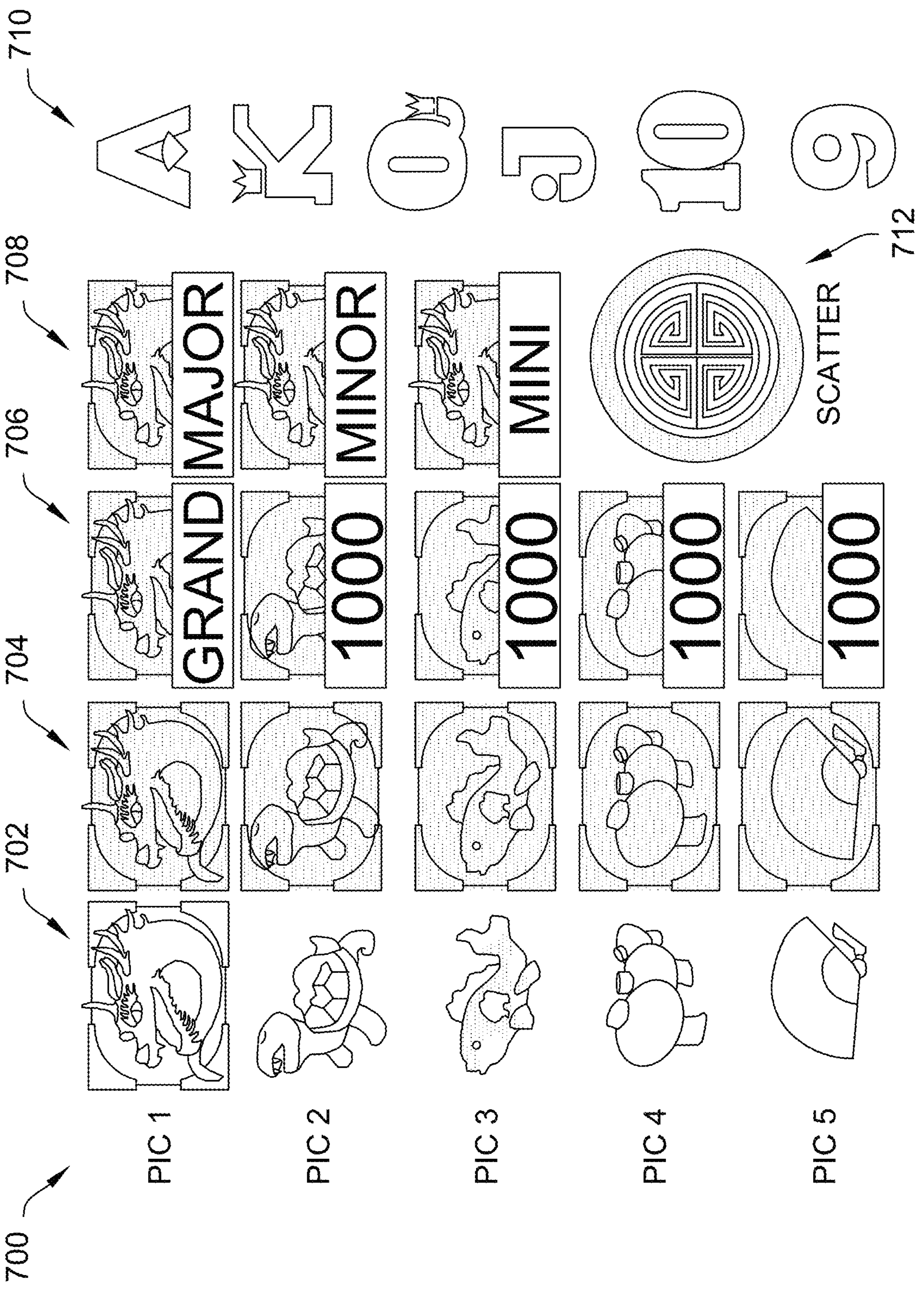
FIG. 7 illustrates an example symbol set that may be used in the example electronic game and associated metamorphic feature described herein.

In the example embodiment, the electronic game uses virtual reel strips that include various basic symbols 412 (e.g., "A", "K", "Q", "J", "10", "9") as well as a set of feature game symbols 414 (e.g., dragon, turtle, fish, lanterns, fan, where FIG. 4A numbers only an example turtle in inactive form for ease of illustration). In some embodiments, the virtual reel strips may also include some scatter symbols 416. The set of feature game symbols 414 (the "feature symbol set"), in this example embodiment, includes five symbols that are initially presented in their "inactive" form (e.g., incurring a ways evaluation similar to the basic symbols 412). Each of the symbols in the feature symbol set include both an inactive image ("inactive form") as well as an active image ("active form") that may be substituted for the inactive image during game play, as described herein. FIG. 7 illustrates an example feature symbol set and also shows the inactive and active forms of each example feature symbol 414.

Figure 4B:
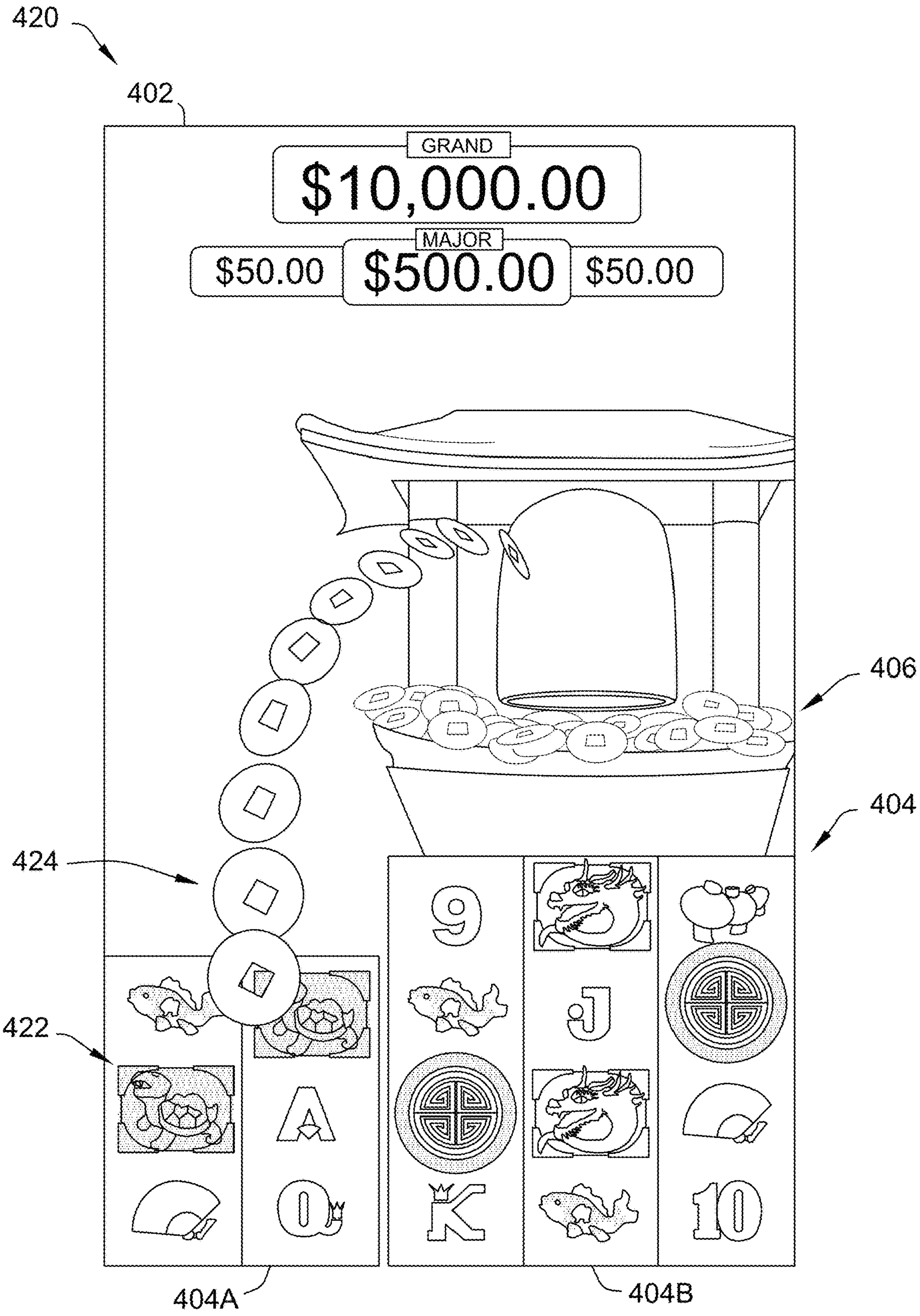

FIG. 4B illustrates an initiation of an example base game spin of the electronic game shown in FIG. 4A. In the example embodiment, at the beginning of a spin of the base game, the electronic game selects one or more of the symbols in the feature symbol set to become active during that spin. In this example, the turtle symbol 422 is selected for activation. As such, in the example embodiment, the electronic game replaces all of the inactive turtle symbols on the reels with activated turtle symbols 422 (e.g., golden images of the turtle) on the reel strip. In another embodiment, the electronic game may store different reel sets for each activated feature symbol (e.g., a set of 5 reels with activated turtles, a set of 5 reels with activated dragons, a set of 5 reels with activated fish, and so forth) and may then select and use that set of reels for the spin (e.g., replacing whatever set of reels was used with the previous spin, perhaps displaying a feathering animation when the reels start spinning, introducing the reel replacement as the reels start spinning).

In the example embodiment, the electronic game also adds or otherwise includes prize identifiers to the activated symbols 422 on the reels in the metamorphic target play area 404B (e.g., on reels 3, 4, and 5), making those symbols "cash-on-reels" symbols that may potentially be won. The prize identifiers may include credit values (e.g., in a number of credits, currency, or the like) or jackpot identifiers (e.g., mini, minor, major, grand) that may be won if that activated symbol 422 appears in a winning combination (e.g., in a 3-of-a-kind or better of a "ways" evaluation). The prize identifiers may increase in size from left to right, as the right-most reels are less likely to appear in a ways win (e.g., in a 4-of-a-kind or 5-of-a-kind). For embodiments with predefined reel strips, the electronic game may include a set of pre-configured reel strips for each of the activated feature symbols (e.g., one set of five reels showing all turtles as activated, one set of five reels showing all dragons as activated, and so forth), and upon selection of which symbol is activated, the electronic game may substitute the appropriate set of reels into game play. For example, each symbol may include a set of pre-defined reels that includes activated symbols on all five reels for that particular symbol, and may also include pre-defined prize values populated onto the activated symbols on reels 3, 4, and 5. In various embodiments, the reels may not include pre-defined prizes and the prize values may be randomly determined on each spin (e.g., based on weighted table(s) for each of the reels, identifying prize values and their corresponding weights). Once the reel modification or selection is performed, the electronic game starts all five reels spinning and stops the two left-most reels first.

In FIG. 4B, the two left-most reels are illustrated in their final stopped position, while the other three reels continue to spin. During each spin, the electronic game is configured to trigger the metamorphic feature when at least one activated symbol appears on both the first and second reels. Here, an activated turtle 422 appears on both the first and second reels, thereby triggering the metamorphic feature.

The metamorphic feature is configured to present two different potential metamorphic actions when the metamorphic feature is triggered (e.g., based on RNG, weighted table, or the like). One metamorphic action that may be triggered is a staging animation, which is illustrated here in FIG. 4B. When the staging animation is triggered, the electronic game displays one or more coins 424 appearing and moving from the triggering play area 404A (e.g., from the activated symbols 422 themselves) to the metamorphic display component 406 (e.g., coins being added to the bowl). This staging animation helps the player understand that the metamorphic feature has been triggered in some way (e.g., based on the occurrence of the activated symbols in the triggering play area 404A). In various embodiments, the metamorphic feature may only be triggered when at least one activated symbol appears on both the first and second reels and a subsequent evaluation determines to trigger the feature. In some of these embodiments, the staging animation may be displayed upon the occurrence of at least one activated symbol on both the first and second reels, regardless of whether the subsequent evaluation determines to trigger the metamorphic feature. If the subsequent evaluation determines to trigger the metamorphic feature, the metamorphic feature activation animation and the feature, as described herein, may be initiated.

Figure 4C:
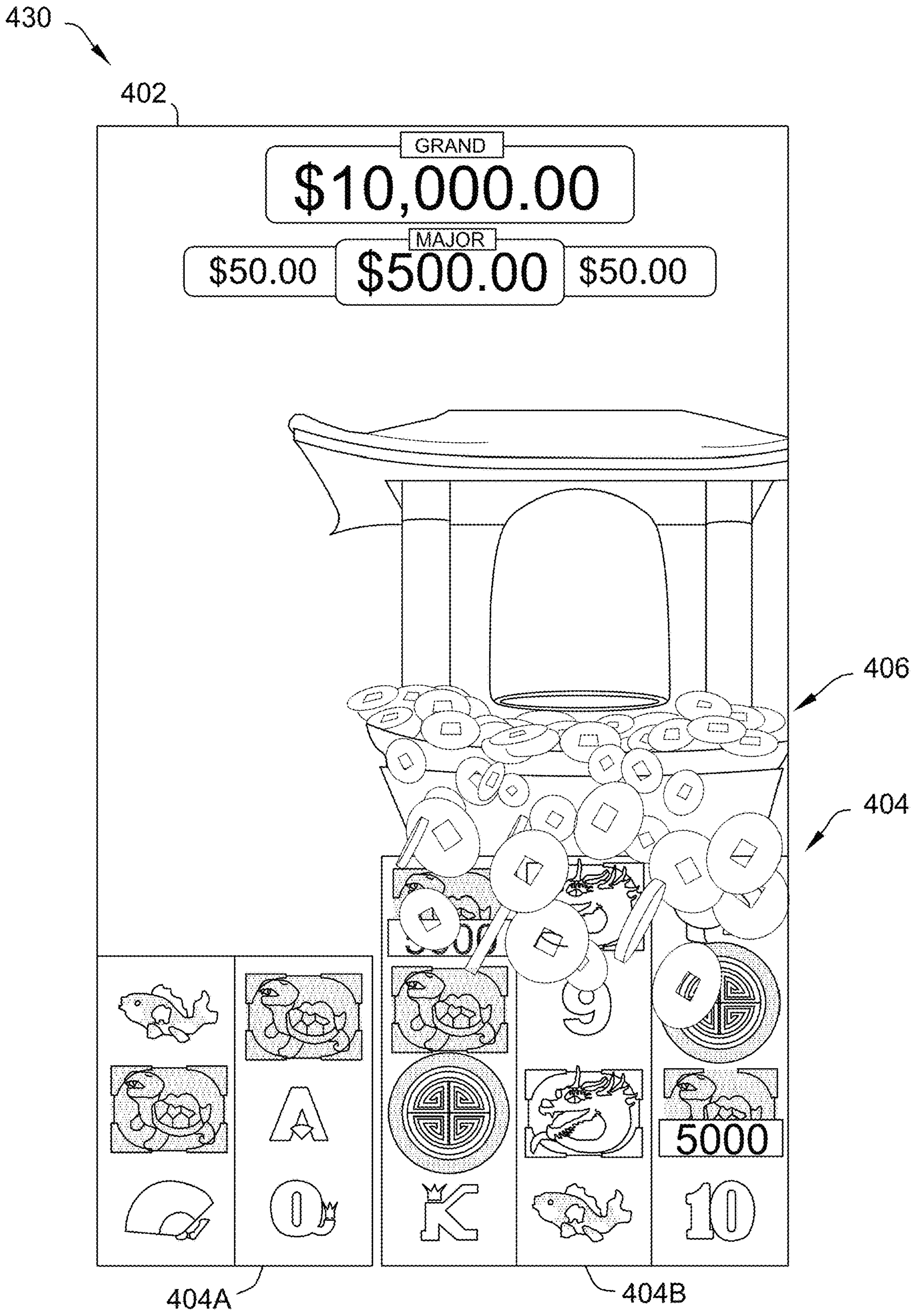

Another metamorphic action that may be triggered is an overlay feature and an associated metamorphic feature activation animation, as illustrated in FIG. 4C. Continuing the above example, in the example embodiment, the electronic game may determine to trigger the metamorphic feature activation (e.g., based on RNG outcome, pre-determined percentage, weighted table, or the like), thereby causing changes to the metamorphic target play area 404B (e.g., the right-most three reels). As the reels continue to spin, the metamorphic feature activation animation displays a shower of golden coins cascading down from the metamorphic display component 406 onto the metamorphic target play area 404B, thereby signaling to the player that the overlay feature has been triggered.

In the example embodiment, the overlay feature activation causes the electronic game to add one or more overlay symbols onto the metamorphic target play area 404B. Overlay symbols may be displayed in any of the symbol positions within the metamorphic target play area 404B and effectively replace the symbol that would otherwise have appeared at that symbol position when the reel is stopped. Further, the overlay symbols may be normal activated symbols or, as in the example embodiment, the overlay symbols may be cash-on-reels activated symbols. Cash-on-reels activated symbols show the normal overlay symbol as well as a prize identifier (e.g., a credit amount, a jackpot, or the like). If one or more cash-on-reels symbols appear in a winning outcome (e.g., 3-of-a-kind or better), the outcome evaluation additionally or alternatively awards the outcome based on the prize identifier(s) appearing in the ways win (e.g., adding any included credit value(s) in the outcome). In some embodiments, the electronic game may select a number of overlay symbols (e.g., based on RNG output, weighted table, or the like) and may select positioning of the overlay symbols (e.g., based on RNG output, weighted table, or the like). The electronic game positions the overlay symbols, then stops the spin and evaluates the outcome of the spin. In other embodiments, the electronic game may stop the spinning of the reels and then display the overlaying of the symbols.

In embodiments where prize identifiers have not yet been added to the activated symbols on reels 3, 4, and 5, the metamorphic feature activation may cause prize identifiers to be added to the activated feature symbols appearing on the reels of the metamorphic target play area 404B (e.g., the right-most three reels). For example, upon initial selection of the turtle symbol for activation during this spin, the electronic game replaces all of the turtle symbols on all five reels with the activated symbol form of that symbol (e.g., all turtles turned to golden turtles). When the metamorphic feature activation is triggered, the electronic game may replace some or all of the activated symbols on the right-most three reels to include cash-on-reels prize identifiers. As such, when the reels stop spinning, the electronic game evaluates the outcome of the spin and similarly awards any cash-on-reels prizes that are included in a ways win.

Figure 4D:
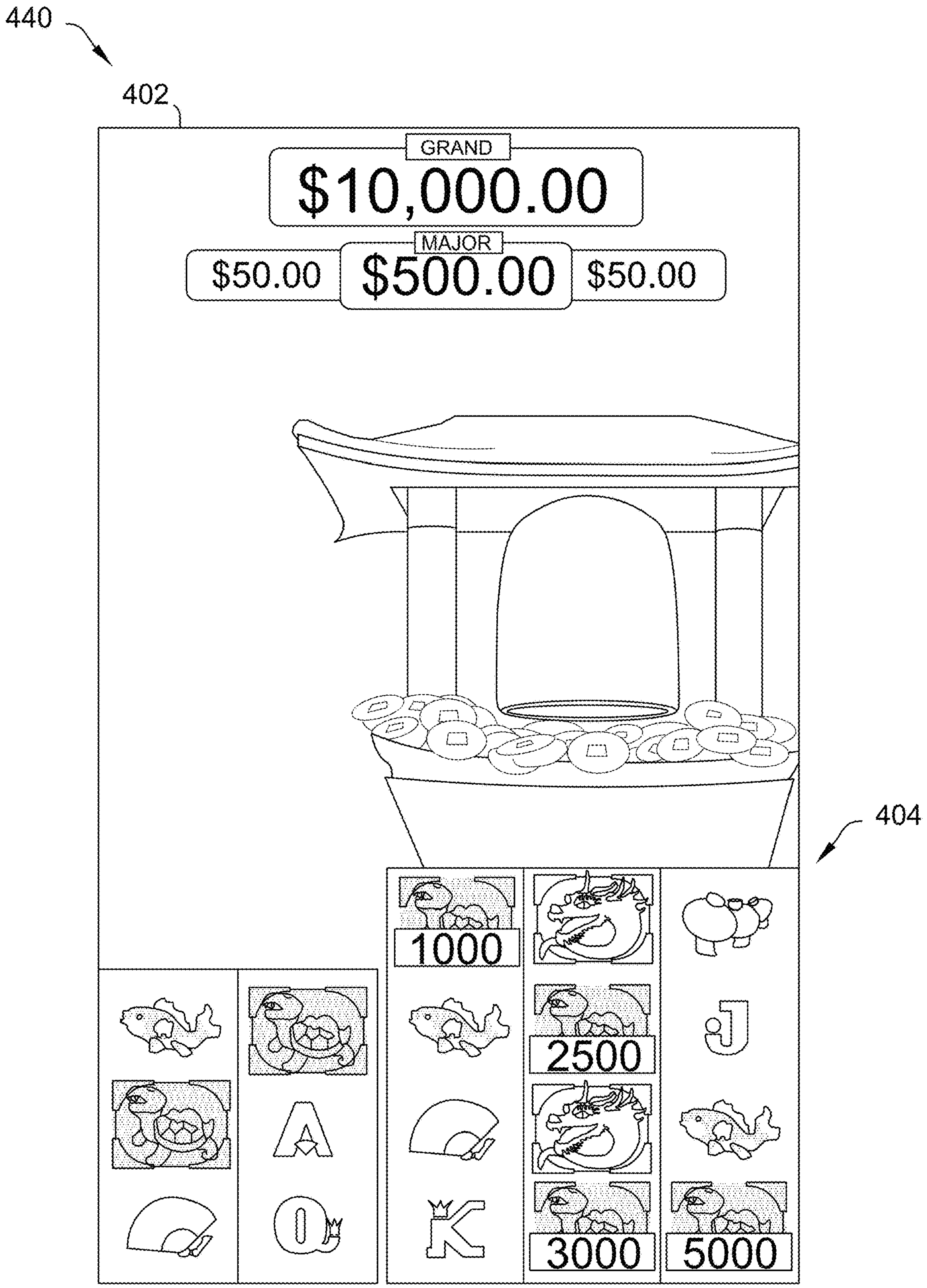

FIG. 4D illustrates a final outcome of the example base game spin described above. In this example, four cash-on-reels symbols appear in the metamorphic target play area 404B, some of which appear on the reels themselves, some of which have been overlaid onto the metamorphic target play area 404B. For example, the “1000” and “3000” activated symbols may have been added as cash-on-reels symbols at the beginning of the spin (e.g., when the turtle symbol was selected for activation) and the “2500” and “5000” activated symbols may have been selected and positioned as overlay symbols. After the spinning of the right-most reels is stopped, the outcome includes a five-of-a-kind in the activated turtles (e.g., having at least one activated turtle in each of the five reels) and, as such, is awarded each of the prizes appearing here (e.g., “1000”, “2500”, “3000”, and “5000” credits). The electronic game may additionally compensate for other ways wins achieved in the spin outcome.

Figure 5A:
FIGS. 5A-5D illustrate an example bonus game that includes the metamorphic feature described above.
Figure 5B:
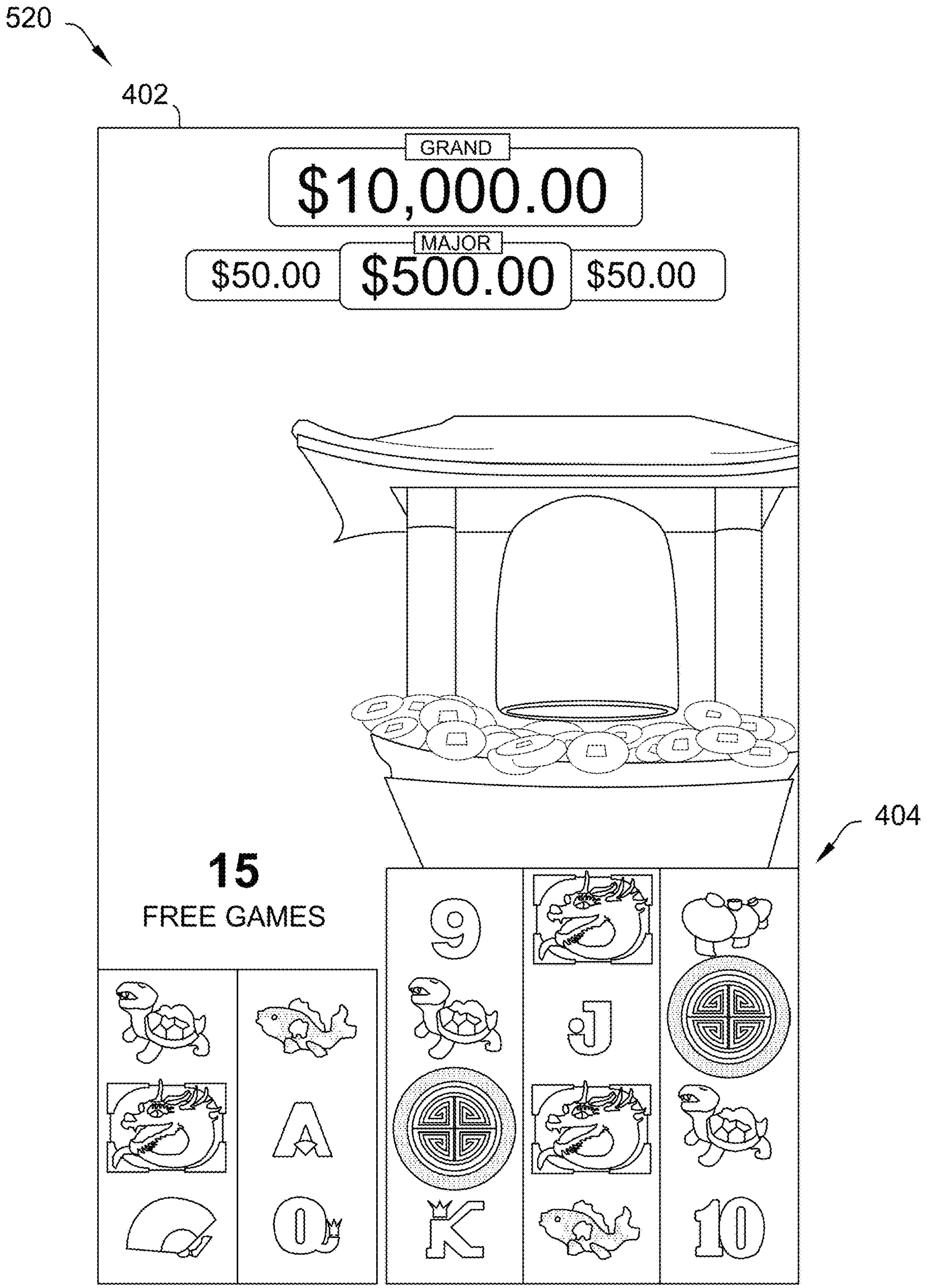
Figure 5C:
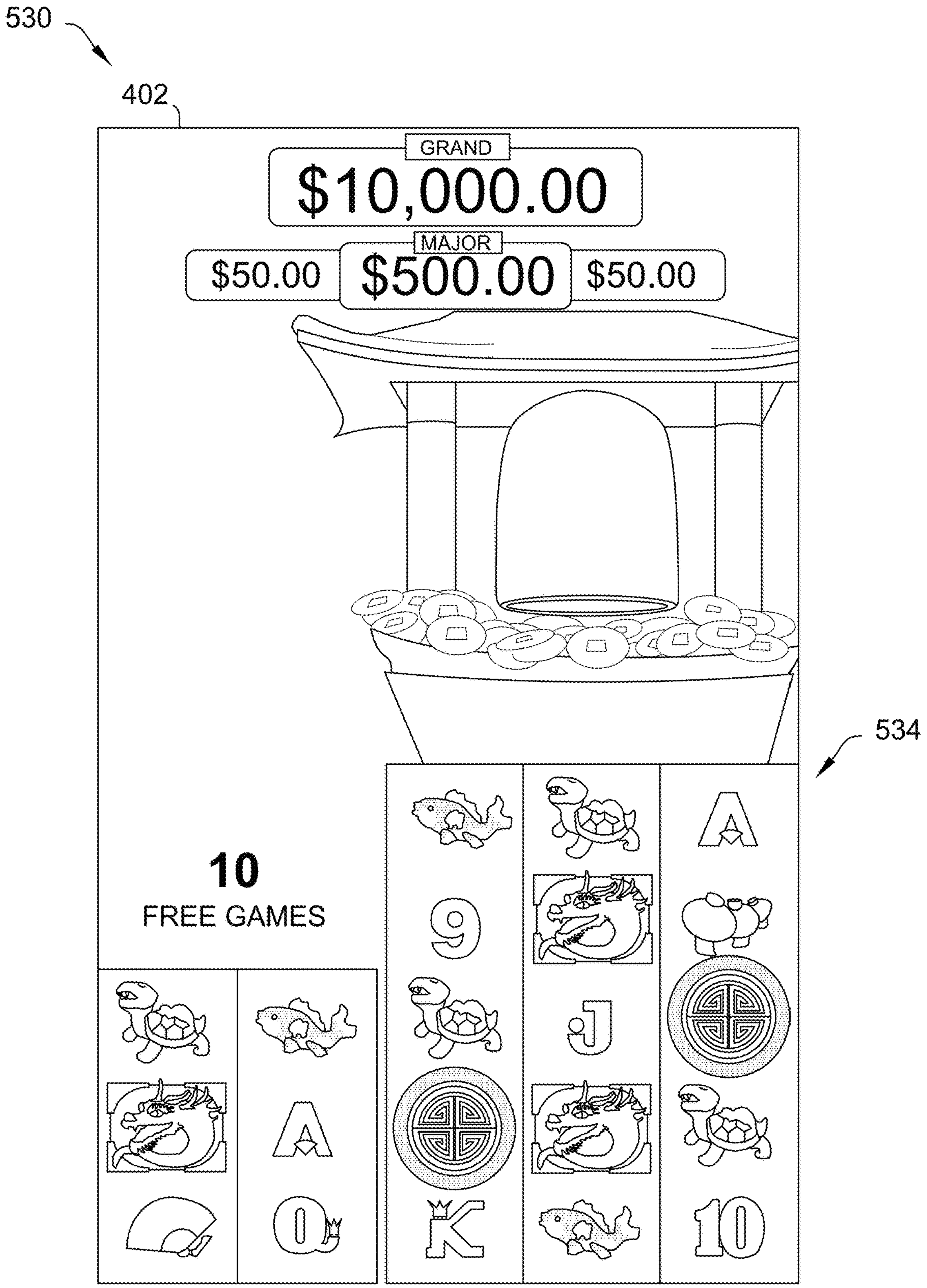
Figure 5D:
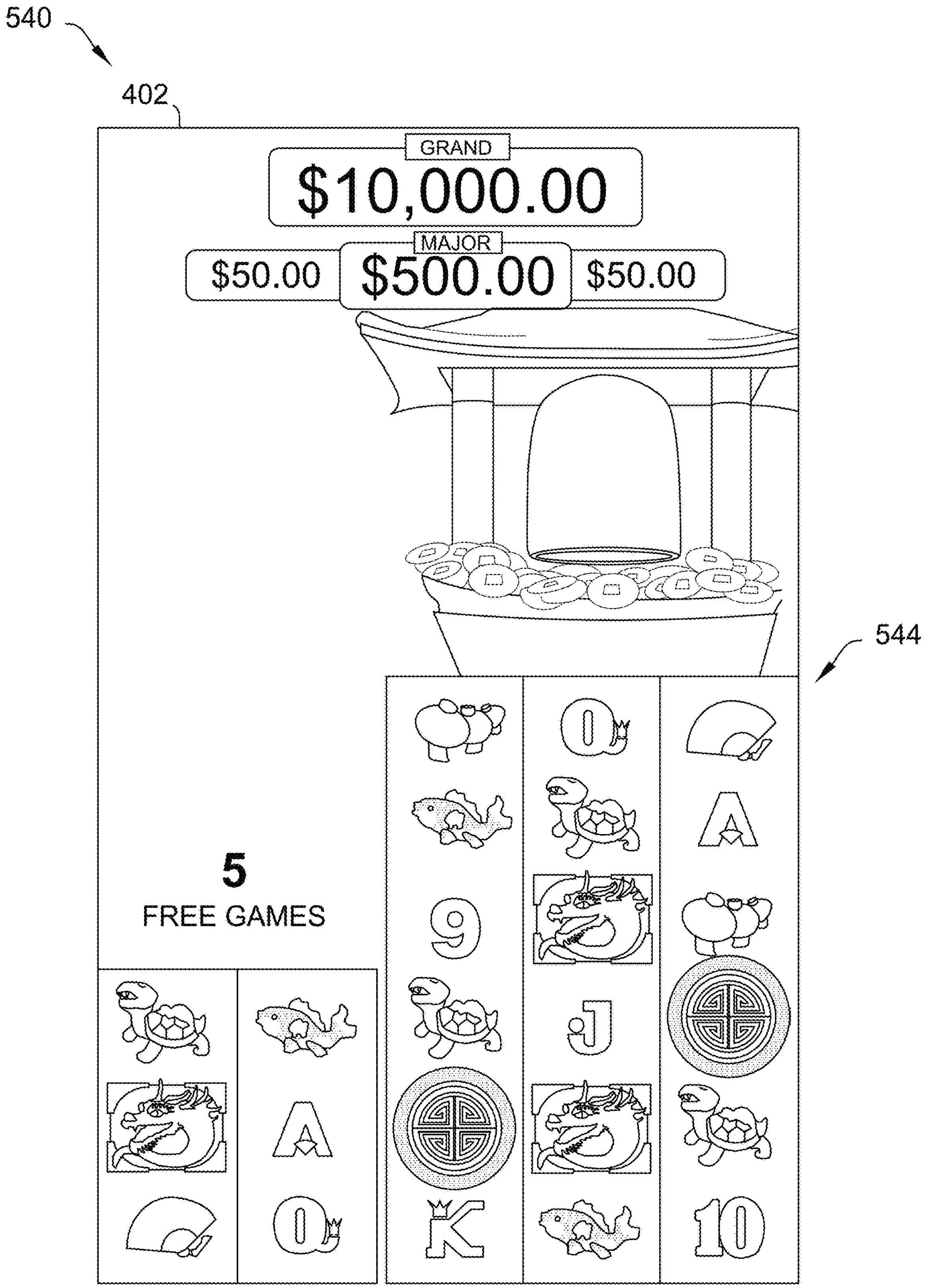

FIGS. 5A-5D illustrate an example bonus game that includes the metamorphic feature described above. In some embodiments, a bonus game may be triggered by, for example, achieving a pre-determined number of scatter symbols 416 in a spin outcome. In the example embodiment, the electronic game presents the player with a bonus game selection after triggering the bonus game and before entering into bonus game play. Here, the player is presented with three options for bonus game play. The first option is a bonus game with 15 free spins in a 3-3-4-4-4 configuration (e.g., “576 ways”). The second option is a bonus game with 10 free spins in a 3-3-5-configuration (e.g., “1125 ways”). The third option is a bonus game with 5 free spins in a 3-3-6-6-6 configuration (e.g., “1944 ways”). Upon selection, the electronic game initiates the bonus game in the selected configuration, with the associated number of free spins, and with the metamorphic feature in effect during feature game play. FIG. 5B illustrates the first option configuration, where the play area 404 is in a 3-3-4-4-4 configuration and the player starts with 15 free spins. FIG. 5C illustrates the second option configuration, where the play area 534 is in a 3-3-configuration and the player starts with 10 free spins. FIG. 5D illustrates the third option configuration, where the play area 544 is in a 3-3-6-6-6 configuration and the player starts with 5 free spins. In another example embodiment, the configuration options of play area 404 may be 3-3-4-4-4 with 15 free spins, 3-3-6-6-6 with 10 free spins, and 3-3-8-8-8 with 5 free spins.

Figure 6:
FIG. 6 illustrates another example bonus game that may include the metamorphic feature described above.

FIG. 6 illustrates another example bonus game that may include the metamorphic feature described above. In some embodiments, the electronic game may present bonus game options that include increased cash-on-reels prizes, with a number of guaranteed gold spins (e.g., at least one activated symbol on reels 1 and 2, a metamorphic trigger action), or some combination thereof. In some embodiments, the base game and bonus game may utilize a bell as a part of the metamorphic animations (e.g., as shown in FIGS. 4A-5D) or a gong (e.g., as shown in FIG. 6). In some embodiments, the electronic game presents an option between 10 free games in a pre-determined configuration (e.g., 3-3-4-4-4) or a pre-determined number of games (e.g., one to three) with guaranteed cash-on-wheels awards in a pre-determined configuration (e.g., 3-3-4-4-4).

FIG. 7 illustrates an example symbol set 710 that may be used in the example electronic game and associated metamorphic feature described herein. Each symbol set 710, 720 includes a set of basic symbols 708, a scatter symbol 712, and five feature symbols. Each of the five feature symbols includes an inactive image 702, a normal (e.g., non-cash-on-reels) activated image 704, and a cash-on-reels activated image 706. Each cash-on-reels activated image 706 includes a prize identifier, shown here with credit values or with jackpot identifiers (e.g., "mini", "minor", "major", "grand"). It should be understood that the number of feature symbols in the feature symbol set may be varied, and the amounts of prizes on the cash-on-wheels symbols may be varied.

Figure 8:
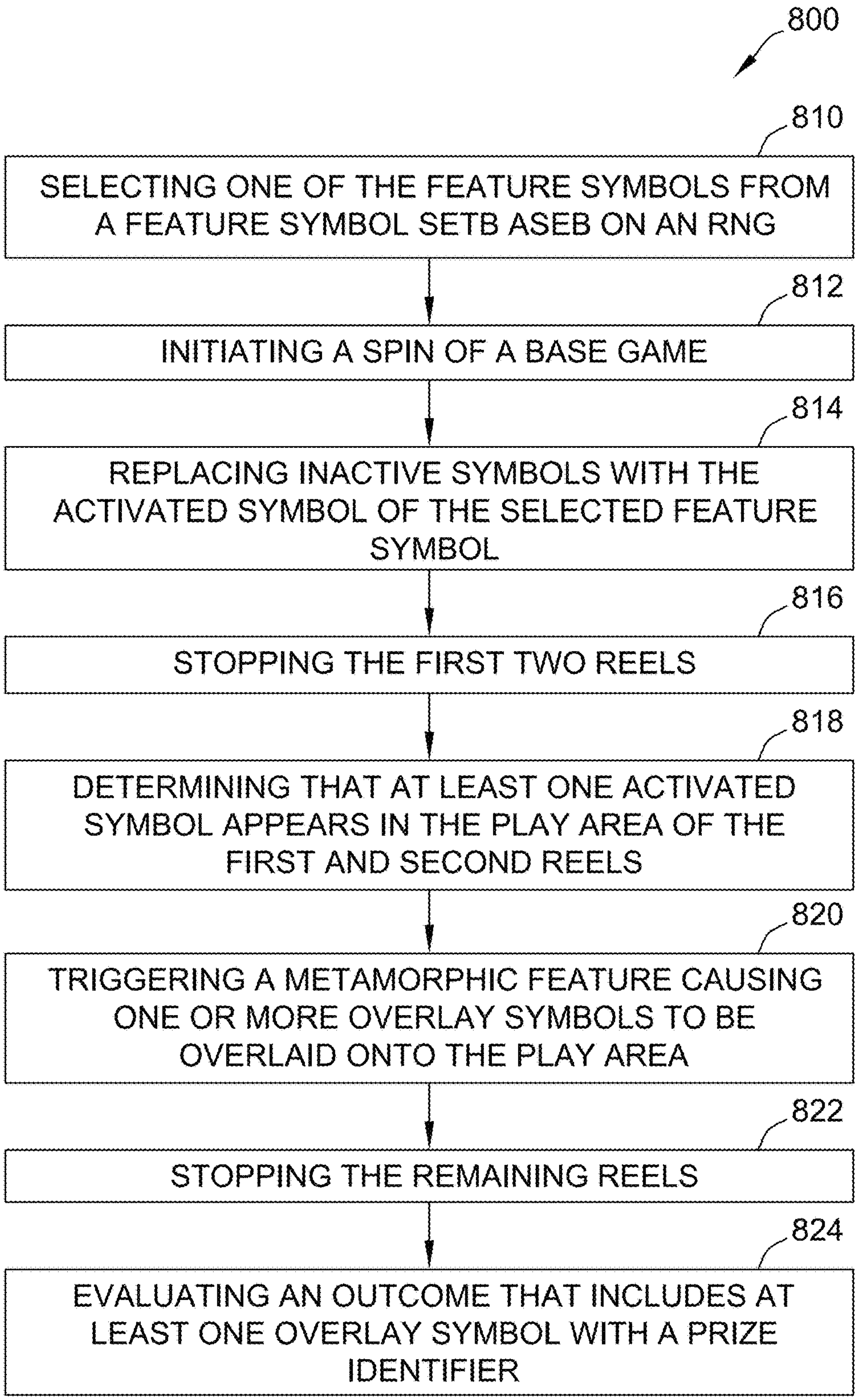
FIG. 8 is a flowchart of an example method for providing an electronic game with a metamorphic feature.

FIG. 8 is a flowchart of an example method 800 for providing an electronic game with a metamorphic feature. In the example embodiment, the method is performed using an electronic gaming device 200 having at least one display device configured to display an electronic game that includes the metamorphic feature, a memory storing a feature symbol set that includes a plurality of feature symbols, each feature symbol of the plurality of feature symbols includes at least an inactive symbol and an activated symbol, and an EGM processor. The method 800 includes selecting one of the feature symbols from the feature symbol set based on an output of a random number generator at operation 810. The method 800 also includes initiating a spin of a base game using a plurality of reels at operation 812. At operation 814, the method 800 includes replacing, on one or more reels of the plurality of reels, the inactive symbols of the selected feature symbol with the activated symbol associated with that selected feature symbol.

In the example embodiment, the method 800 includes causing the first and second reels of the plurality of reels to stop at operation 816. At operation 818, the method 800 includes determining that at least one activated symbol appears in a play area on each of the first and second reels. The method 800 also includes triggering a metamorphic feature causing one or more overlay symbols to be overlaid onto one or more symbol positions of the play area, where each overlay symbol of the one or more overlay symbols includes a prize identifier at operation 820. The method 800 further includes stopping the other reels of the plurality of reels at operation 822, evaluating an outcome of the spin that includes at least one overlay symbol with a prize identifier and awarding a prize indicated by the prize identifier based on the evaluation at operation 824.

Figure 9:
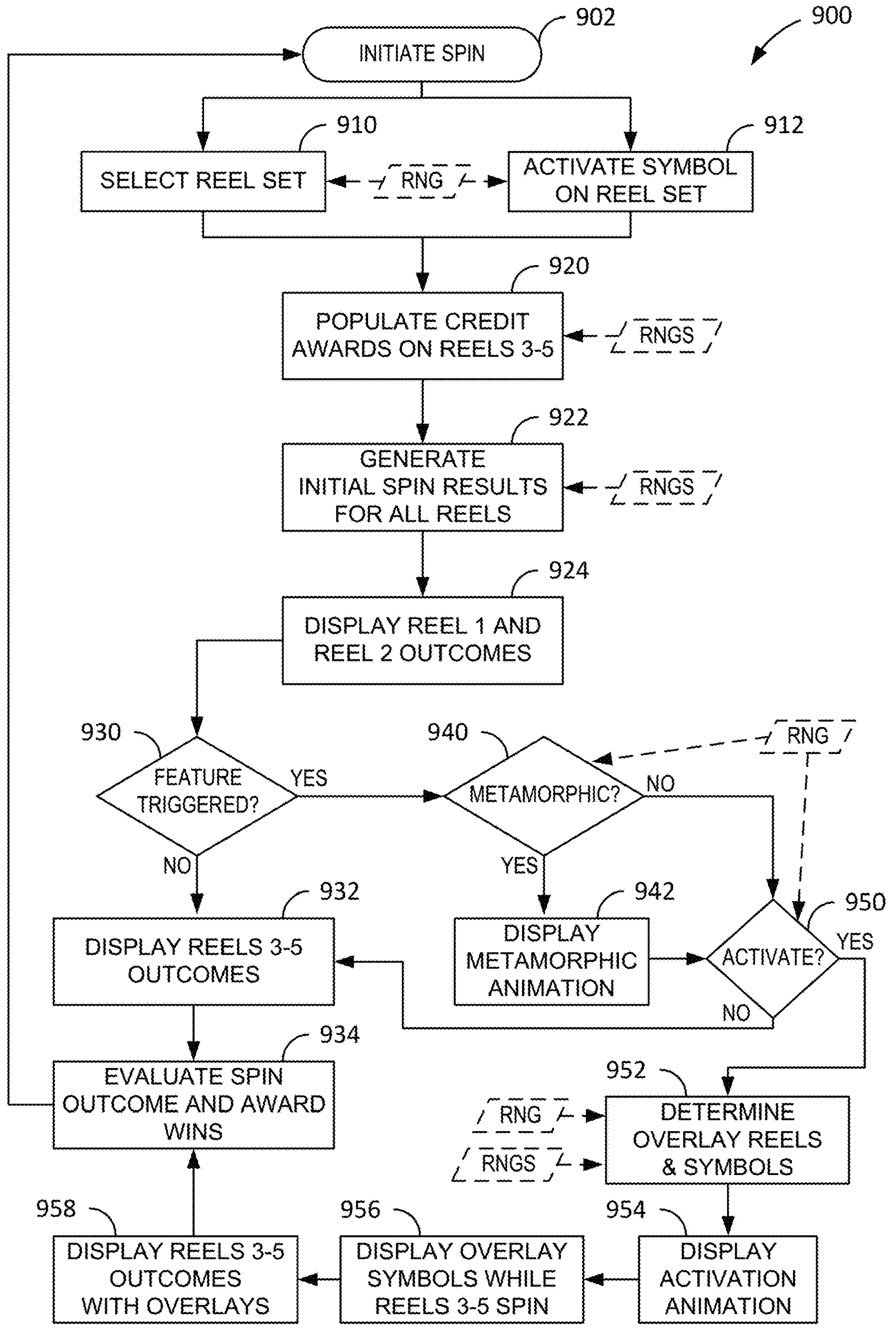
FIG. 9 is a flowchart of another example method for providing an electronic game with a metamorphic feature.

FIG. 9 is a flowchart of another example method 900 for providing an electronic game with a metamorphic feature. This method 900 may also be performed by the electronic gaming device 200, similar to method 800. One situation that can arise with this overlay feature is an overlay that may be detrimental to the player. For example, consider a situation where a 1000 credit cash-on-reels symbol is overlayed onto a position that otherwise would have contained a higher award symbol (e.g., a cash-on-reels symbol with a higher credit award or a jackpot award). Players may witness this overlay feature actually causing them to be awarded less because of the feature, thereby leading to a negative experience. As such, in some embodiments, the electronic game may be configured to avoid such negative overlay situations.

In one such embodiment, the electronic game may be configured to dynamically remove (e.g., push, bump out, or the like) an overlay symbol that either results in a lesser award or is a lesser-valued symbol. For example, after the electronic game determines which symbol positions are going to be overlaid (the "overlaid symbol," e.g., the symbol naturally appearing in that position on the reel) with which particular overlay symbol (e.g., the symbol initially chosen to overlay onto that position in the play area), the electronic game may compare an overlaid symbol with an overlay symbol and may use whichever of the symbols has a greater cash-on-reels award. In another example, the electronic game may perform outcome awards using each combination of overlaid symbol or overlay symbol to determine which award outcome is the highest and may thus use whichever overlaid or overlay symbol generates the highest award.

In another embodiment, the electronic game may be configured to dynamically combine both the overlaid symbol and the overlay symbol. For example, when the overlaid symbol and the overlay symbol are both cash-on-reels symbols, the electronic game may add the both awards together and show a combined total. In another example, the overlaid symbol may be a normal, non-cash-on-reels symbol but that, if not otherwise overlaid, would participate in a winning combination. As such, the electronic game may show both the overlaid symbol and the overlay symbol and may calculate the award using both symbols.

In yet another example, the electronic game ensures that an overlay symbol will not appear over another cash-on-reels symbol based aspects of configuration of the reel sets. In one such embodiment, the electronic game may add activated feature symbols to reels 1 and 2. Overlaying an activated feature symbol with another activated feature symbol, or perhaps an activated feature symbol with a cash-on-reels award, no reduction of an award occurs as the overlay symbol is at least as valuable as the overlaid symbol. However, some overlay outcomes on reels 1 and 2 may impact other non-feature-symbol-related outcomes. For example, consider the following outcomes for reels 1 and 2:

TABLE 1

Example Reel 1 and Reel 2 Outcome

| Reel 1 | Reel 2 |
|---|---|
| PIC5 | GOLD_PIC_1 |
| GOLD_PIC_1 | TEN |
| TEN | PIC4 |

In this example, "GOLD_PIC_1" represents an activated feature symbol (e.g., a gold turtle without a cash-on-reels award) and the other symbols PIC4, PIC5, and TEN represent normal symbols, such as ACE to TEN symbols or inactive feature symbols (e.g., the inactive PIC1 to PIC5 symbols, excluding the inactive symbol for whichever feature symbol has been activated). In this example, the TEN on Reel 1 and the TEN on Reel 2 are candidates to potentially participate in an award when Reels 3-5 are resolved. As such, overlaying either of these TEN symbols has the potential to eliminate a particular win.

Accordingly, in one embodiment, the reel sets are configured such as to avoid any potential for the same symbols appearing around the feature symbols. Since three symbol positions are exposed on Reels 1 and 2 during any spin, the reel strips may be configured to have a restricted set of symbols appearing within two symbol positions of any feature symbol. For example, the two symbol positions above and below any feature symbol (e.g., GOLD_PIC_1) on Reel 1 may only include symbols from a first subset of symbols (e.g., ACE, KING, TEN, PIC2, PIC3), where the two symbol positions above and below any feature symbol on Reel 2 may only include symbols from a second subset of symbols (e.g., QUEEN, JACK, PIC4, PIC5), where the two subsets of symbols share no members (e.g., are disjoint sets). Reels constructed in such a way do not generate any normal wins that may be impacted by overlaying feature symbols onto reels 1 and 2.

In the example method 900 shown in FIG. 9, the electronic game avoids overlaying feature symbols on Reels 3-5 by pre-determining a spin result of Reels 3-5 (e.g., while Reels 3-5 continue to spin) and dynamically selecting only symbol positions that are determined not to already have a feature symbol. Consider the following example. At operation 902, an instance of game play is initiated (e.g., a spin is initiated). In one embodiment, at operation 912, the electronic game may activate a particular feature symbol on a set of five base reels (e.g., selecting one of the five feature symbols via RNG and replacing all of those particular inactive symbols with active symbols). In the example embodiment, the electronic game instead has five sets of reels, each of which are pre-configured to have one of the five feature symbols in its active form and all of the other four feature symbols in their inactive form. At operation 910, the electronic game selects one of the five reel sets to use for this spin. More specifically, during reel selection, the electronic game may select one of the five sets of reels that activate one of the five feature symbols using an RNG outcome and the following example weighted table:

TABLE 2

Example Reel Selection Weighted Table

| Reel Set | Weight | Probability of Weighted Selection |
|---|---|---|
| BaseReels_1 | 1 | 9.091% |
| BaseReels_2 | 2 | 18.182% |
| BaseReels_3 | 3 | 27.273% |
| BaseReels_4 | 4 | 36.364% |
| BaseReels_5 | 1 | 9.091% |

In this example, BaseReels_1 has the dragon symbol activated (e.g., PIC1 of FIG. 7), BaseReels_2 has the turtle symbol activated (e.g., PIC2), BaseReels_3 has the fish symbol activated (e.g., PIC3), BaseReels_4 has the mushrooms symbol activated (e.g., PIC4), and BaseReels_5 has the fan symbol activated (e.g., PIC5).

Presume that the above weighted reel set selection in this example spin resulted in use of BaseReels_1. Also consider an example portion of each of the reel strips for BaseReels_1:

TABLE 3

Example Reel Strip Portions

| Reel 1 | Reel 2 | Reel 3 | Reel 4 | Reel 5 |
|---|---|---|---|---|
| PIC5 | ACE | QUEEN_T | JACK_T | KING_T |
| JACK | QUEEN | PIC2_T | PIC2_T | PIC5_T |
| GOLD_PIC1 | GOLD_PIC1 | JACK_T | GOLD_PIC1 | PIC5 |
| PIC5 | ACE | PIC3 | PIC4_T | JACK |
| KING | PIC4 | GOLD_PIC1 | KING_T | PIC3_T |
| ACE | PIC5 | PIC4_T | PIC4_T | TEN_T |
| PIC5 | ACE | JACK_T | TEN_T | QUEEN |
| JACK | PIC3 | PIC2 | PIC3_T | SCAT |
| GOLD_PIC1 | GOLD_PIC1 | SCAT | KING | KING |
| PIC5 | ACE | QUEEN | SCAT | PIC2_T |
| JACK | PIC4 | PIC4_T | TEN | TEN_T |
| ACE | PIC5 | JACK_T | PIC3_T | PIC5 |
| PIC5 | PIC2 | PIC2_T | QUEEN_T | PIC5 |
| PIC2 | KING | PIC2_T | PIC2_T | QUEEN_T |

In this example, PIC1 has been activated (e.g., the dragon as "GOLD_PIC1," or the golden dragon) and the other four feature symbols, PIC2 through PIC5, are in their inactive forms. Further, the symbol set includes symbols ACE, KING, QUEEN, JACK, and TEN, all of which are normal symbols, as well as a scatter symbol 416, SCAT. It should be understood that only a portion of the example reel strips are shown here, and that such reel strips may be hundreds of positions long. Further, it should be understood that the other reel sets for the other four feature symbols are similarly constructed, but with "GOLD" symbols for their respective entries on the reels.

Note that these example reel strips include two types of symbol identifiers for each normal symbol and inactive feature symbol, a non-marked symbol identifier and a marked symbol identifier. For example, the non-marked symbol identifiers for each symbol include the name of the symbol (e.g., ACE, JACK, PIC2) and the marked symbol identifiers for those same symbols include the symbol identifier with a special suffix "_T" (e.g., ACE_T, JACK_T, PIC2_T). In this example, each non-marked symbol and its marked symbol counterpart are displayed as the same symbol and are evaluated identically during outcome evaluation. However, the marked symbols are used by the electronic game during overlay determination to avoid overlaying other active feature symbols, as described below.

Once a reel set has been identified for this spin, in the example embodiment, the electronic game dynamically populates credit awards on each of the active feature symbols of reels 3-5 at operation 920. The electronic game may use one or more weighted tables for populating the credit awards, where each of the weighted tables includes entries for various awards and their respective weights (e.g., their probabilities of being selected for a given feature symbol). For example, each reel set may be configured with a single weighted table or with a different weighted table for each of reels 3, 4, and 5 (e.g., with lesser awards or higher weights for lesser awards on reel 3, and increasing awards or higher weights for greater awards on the later reels 4 and 5). The electronic game may, as such, use an RNG output for each of the active feature symbols on reels 3-5 to populate each with a dynamic award. In other embodiments, the reel sets may have static credit awards pre-configured in the prize areas on each of the active feature symbols.

At operation 922, in the example embodiment, the electronic game generates an initial spin result for each of the five reels (e.g., using separate RNG outputs for each reel). At operation 924, the electronic game displays all five reels as spinning and then stops reels 1 and 2 to show their final outcomes while reels 3-5 continue spinning.

At test 930, the electronic game determines whether or not a primary feature is triggered. In this example, the primary feature is triggered when at least one active feature symbol appears on reel 1 and on reel 2. If this primary feature condition is not met at test 930, then the electronic game stops the spinning of reels 3-5 and displays the final outcomes of those reels at operation 932. The electronic game then evaluates the spin outcome and awards any wins at operation 934. Once complete, the electronic game returns to initiate the next spin at operation 902.

If, at test 930, the primary feature is triggered, then the electronic game determines whether or not to activate a metamorphic display feature (e.g., a coin tossed up into a bowl), activate an overlay feature, or both. In the example embodiment, activation of the metamorphic feature includes displaying a metamorphic animation at operation 942. The metamorphic animation may include, for example, displaying coin(s) 424 being tossed up into the metamorphic display component 406 as shown in FIG. 4B, and perhaps occasionally growing a state of the metamorphic display component 406 (e.g., displaying the bowl moving through various states of fullness).

At test 950, the electronic game determines whether or not to activate the overlay feature (e.g., based on an RNG output and a weighted table, or the like). If the overlay feature is not activated, the electronic game proceeds to operations 932 and 935, displaying the outcomes of reels 3-5, evaluating the spin result, and generating any appropriate award.

If, at test 950, the electronic game determines to activate the overlay feature, then the electronic game determines which of the reels 3, 4, and 5 to activate for overlays during this spin. Consider the following weighted table for overlay reel selection:

TABLE 4

Example Overlay Reel Selection Weighted Table

| Reel Active | Weight | Probability of Weighted Selection |
|---|---|---|
| NONE | 687 | 68.700% |
| 3 | 47 | 4.700% |
| 4 | 146 | 14.600% |
| 5 | 24 | 2.400% |
| 3_4 | 31 | 3.100% |
| 3_5 | 52 | 5.200% |
| 4_5 | 9 | 0.900% |
| 3_4_5 | 4 | 0.400% |

In this example, the activated overlay reel(s) are identified by the "Reel Active" column, where "3_4" includes activating both reel 3 and reel 4, and the like. The electronic game generates a random number and identifies one of the rows from this weighted table, thus determining which, if any, of the reels 3, 4, and 5 to add overlay symbols to for this spin. In this example, it should be understood that test 950 and operation 952 may effectively use a single RNG for purposes of determining which reel(s) to activate or not, where the "NONE" entry in the above Table 4 is effectively the "NO" activation option of test 950.

Presume, for example, that this example overlay determination at operation 952 identifies reel 3 and reel 5 for overlay symbols during this example spin. In addition, presume the initial spin result for reels 3-5 (e.g., as determined at operation 922) is the following 3-3-4-4-4 outcome:

TABLE 5

Example Initial Reel Spin Result

| Reel 1 | Reel 2 | Reel 3 | Reel 4 | Reel 5 |
|---|---|---|---|---|
| | | GOLD_PIC1 | PIC3_T | PIC5_T |
| GOLD_PIC1 | ACE | PIC4_T | KING | PIC5 |
| PIC5 | QUEEN | JACK_T | SCAT | JACK |
| JACK | GOLD_PIC1 | PIC2 | TEN | PIC3_T |

In this example spin, the electronic game spins and stops reel 1 and reel 2 as shown above at operation 924. This reel 1 and reel 2 spin outcome includes one activated feature symbol appearing on both reel 1 and reel 2. As such, and still at operation 952, the electronic game also determines which symbol positions on reels 3-5 to place an overlay symbol, as well as what prize awards to include in each.

More specifically, in this example embodiment, determines which of the symbol positions on reel 3 and reel 5 (the two reels that were identified for overlay above) by identifying which symbol positions on reels 3 and 5 have marked symbol identifiers (e.g., the symbols with the "_T" suffix). Any of the symbol positions that have a marked symbol identifier on any of the reels identified for overlay are the symbol positions that are used for overlay symbols. In this example, the PIC4 T and JACK_T marked symbol identifiers appearing on reel 3 are identified as overlay symbol positions, as well as the PIC5_T and PIC3 T marked symbol identifiers appearing on reel 5.

At operation 954, the electronic game displays an activation animation at operation 954, thereby providing a visual indication to the player that this overlay feature has been activated. The activation animation may be similar to the animation shown and described in FIG. 4C (e.g., coins pouring out of the bowl and down onto the play area). Once the overlay symbol positions have been identified as described above, the electronic game displays the overlay symbols appearing in those particular symbol positions at operation 956. In the example embodiment, the electronic game displays reels 3, 4, and 5 as continuing to spin while the overlay symbols are placed into their positions. While the initial spin result of reels 3, 4, and 5 are already determined by the electronic game (e.g., at operation 922), this overlay display mechanic allows the player to visually identify and understand the appearance of the overlay symbols. Once the overlay symbols have been displayed, the electronic game stops reels 3, 4, and 5 spinning at operation 958, and thus displays a final spin result. The example displayed final spin result below shows the initial spin result overlaid with the overlay symbols, as such:

TABLE 6

Example Final Reel Spin Result

| Reel 1 | Reel 2 | Reel 3 | Reel 4 | Reel 5 |
|---|---|---|---|---|
| | | GOLD_PIC1 | PIC3_T | OVERLAY |
| GOLD_PIC1 | ACE | OVERLAY | KING | PIC5 |
| PIC5 | QUEEN | OVERLAY | SCAT | JACK |
| JACK | GOLD_PIC1 | PIC2 | TEN | OVERLAY |

In the above example, OVERLAY indicates the positions of each of the overlay symbols, thus masking any of the marked "T" symbol identifiers on reel 3 and reel 5. It should be understood that the OVERLAY symbol(s) represent an activated symbol (e.g., GOLD_PIC1) and may include a cash-on-reels award, each of which may be different.

Upon displaying the final reel outcome with overlay symbols, the electronic game proceeds to operation 934, evaluating the spin outcome and awarding wins. In this example embodiment, since only the marked symbol identifiers are used as overlay symbol positions, the electronic game ensures that no activated symbol will be overlaid, and thus avoids potentially overlaying a greater feature symbol with a lesser feature symbol.

The above method 900 addresses several technical problems that arise when overlay symbol features are introduced into an electronic game. When overlay symbols are used, in some situations, the overlay symbols may cover up symbols that may otherwise contribute to a winning evaluation. While overlay symbols are typically intended to improve evaluation outcomes, there can be situations in which additions of overlay symbols in particular positions mask what would otherwise have been a win (e.g., a winning payline). The EGM 104 may be programmed to evaluate a potential outcome both with and without overlay symbols to identify those particular situations. However, this requires additional computation, both to identify the situations and to take rectifying actions (e.g., determine different positions where the overlay symbols are placed, evaluate those new possibilities, redraw a new outcome, or the like). The above method 900 provides technical solutions to these problems that reduces the computational burden by avoiding these situations entirely. For example, limiting which symbols appear above and below activated symbols on reels 1 and 2 ensures that only the activated symbols will form wins (e.g., in left-to-right evaluations). In addition, using marked symbol identifiers allows developers to control where those overlay symbols will appear and to do so using the marked symbol identifiers already appearing on the reels (e.g., rather than performing computations to identify locations).

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming machine comprising:

at least one display device configured to display an electronic game;

at least one memory device storing a reel set for the electronic game, the reel set including at least a first reel, a second reel, and a third reel, wherein the first reel, the second reel, and the third reel each include a plurality of positions each defined in part by a respective identifier, the plurality of positions of the third reel including (1) one or more marked positions including a symbol identifier that includes a designated tag and designates the marked positions as capable of displaying overlay symbols and (2) one or more non-marked positions that includes a symbol identifier that does not include the designated tag and are not capable of displaying overlay symbols and that form part of a predefined symbol pattern; and a game controller configured to execute instructions stored in at least one memory that, when executed, cause the game controller to at least:

cause the display device to display a spin of at least the first reel, the second reel, and the third reel of the reel set of the electronic game;

cause the display device to display a stopping of spinning of the first reel and the second reel, wherein the stopping position of the first reel and the second reel are determined based at least in part on a respective random number generator call, and wherein a subset of symbols of the first reel and the second reel are displayed based on the determined stopping position of the first reel and the second reel;

after the first reel and the second reel stop spinning and prior to stopping spinning of the third reel, in response to determining that at least one feature symbol appears on the displayed subset of symbols of each of the first reel and the second reel, parse the third reel to identify the one or more marked positions based on the one or more marked positions including a symbol identifier having the designated tag;

identify, by selecting only from the identified one or more marked positions including the symbol identifier having the designated tag, one or more positions of the third reel in which to place an overlay symbol based on an random number generator outcome;

modify at least the third reel of the reel set to place a respective one of one or more overlay symbols in the identified one or more positions, wherein each overlay symbol of the one or more overlay symbols includes a prize identifier;

cause the display device to display a stopping of the spinning of the third reel of the reel set to display the one or more overlay symbols including the prize identifier, wherein the stopping position of the third reel is determined based at least in part on another random number generator call, and wherein a subset of symbols of the third reel is displayed based on the determined stopping position of the third reel and includes the one or more overlay symbols;

evaluate an outcome of the spin based on the displayed subset of the first reel, the second reel, and the third reel that includes the one or more overlay symbols with an associated prize identifier; and award a prize indicated by the prize identifier based on the evaluation.

2. The electronic gaming machine of claim 1, wherein the instructions further cause the game controller to dynamically add the prize identifiers to each overlay symbol based on an output of the random number generator.

3. The electronic gaming machine of claim 1, wherein each overlay symbol includes a static prize identifier.

4. The electronic gaming machine of claim 1, wherein the instructions further cause the game controller to:

select one or more reels from a plurality of reels of the reel set including the third reel for an overlay feature; and add the one or more overlay symbols to the selected reels.

5. The electronic gaming machine of claim 4, wherein the instructions further cause the game controller to:

determining the prize identifier for each overlay symbol of the one or more overlay symbols based on output of a random number generator; and displaying each overlay symbol with an associated prize identifier.

6. The electronic gaming machine of claim 1, wherein each reel of the reel set includes a first set of non-feature symbols and a second set of non-feature symbols that does not overlap with the first set of non-feature symbols, wherein symbols adjacent to feature symbols on the first reel are from the first set of non-feature symbols, and wherein symbols adjacent to feature symbols on the second reel are from the second set of non-feature symbols.

7. The electronic gaming machine of claim 1, wherein the instructions further cause the game controller to display a metamorphic feature animation during the spin, thereby visually identifying that the third reel is being modified to include the one or more overlay symbols.

8. A method for providing an electronic game, the method performed by a game controller in communication with a display device and at least one memory device storing a reel set that includes at least a first reel, a second reel, and a third reel, wherein the first reel, the second reel, and the third reel each include a plurality of positions each defined in part by a respective identifier, the plurality of positions of the third reel including (1) one or more marked positions including a symbol identifier that includes a designated tag and designates the marked positions as capable of displaying overlay symbols and (2) one or more non-marked positions that includes a symbol identifier that does not include the designated tag and are not capable of displaying an overlay symbol and that form part of a predefined symbol pattern, the method comprising:

- causing the display device to display a spin of at least the first reel, the second reel, and the third reel of the reel set of the electronic game;
- causing the display device to display a stopping of spinning of the first reel and the second reel, wherein the stopping position of the first reel and the second reel are determined based at least in part on a respective random number generator call, and wherein a subset of symbols of the first reel and the second reel are displayed based on the determined stopping position of the first reel and the second reel;
- after the first reel and the second reel stop spinning and prior to stopping spinning of the third reel, in response to determining that at least one feature symbol appears on the displayed subset of symbols of each of the first reel and the second reel, parse the third reel to identify the one or more marked positions based on the one or more marked positions including a symbol identifier having the designated tag;
- identifying, by selecting only from the identified one or more marked positions including the symbol identifier having the designated tag, one or more positions of the third reel in which to place an overlay symbol based on an random number generator outcome;
- modifying at least the third reel of the reel set to place a respective one of one or more overlay symbols in the identified one or more positions, wherein each overlay symbol of the one or more overlay symbols includes a prize identifier;
- causing the display device to display a stopping of the spinning of the third reel of the reel set to display the one or more overlay symbols including the prize identifier, wherein the stopping position of the third reel is determined based at least in part on another random number generator call, and wherein a subset of symbols of the third reel is displayed based on the determined stopping position of the third reel and includes the one or more overlay symbols;
- evaluating an outcome of the spin based on the displayed subset of the first reel, the second reel, and the third reel that includes the one or more overlay symbols with an associated prize identifier; and
- awarding a prize indicated by the prize identifier based on the evaluation.

9. The method of claim 8, further comprising dynamically adding the prize identifiers to each overlay symbol based on an output of the random number generator.

10. The method of claim 8, wherein each overlay symbol includes a static prize identifier.

11. The method of claim 8, further comprising:

- selecting one or more reels from a plurality of reels of the reel set including the third reel for an overlay feature; and
- adding the one or more overlay symbols to the selected reels.

12. The method of claim 11, further comprising:

- determining the prize identifier for each overlay symbol of the one or more overlay symbols based on output of a random number generator; and
- displaying each overlay symbol with an associated prize identifier.

13. The method of claim 8, wherein each reel of the reel set includes a first set of non-feature symbols and a second set of non-feature symbols that does not overlap with the first set of non-feature symbols, wherein symbols adjacent to feature symbols on the first reel are from the first set of non-feature symbols, and wherein symbols adjacent to feature symbols on the second reel are from the second set of non-feature symbols.

14. The method of claim 8, further comprising displaying a metamorphic feature animation during the spin, thereby visually identifying that the third reel is being modified to include the one or more overlay symbols.

15. At least one non-transitory computer-readable storage media having instructions embodied thereon, wherein when executed by a game controller in communication with at least one memory device and at least one display device configured to display an electronic game, the memory device storing a reel set including at least a first reel, a second reel, and a third reel, wherein the first reel, the second reel, and the third reel each include a plurality of positions each defined in part by a respective identifier, the plurality of positions of the third reel including (1) one or more marked positions including a symbol identifier that includes a designated tag and designates the marked positions as capable of displaying overlay symbols and (2) one or more non-marked positions that includes a symbol identifier that does not include the designated tag and are not capable of displaying an overlay symbol and that form part of a predefined symbol pattern, the instructions cause the game controller to at least:

- cause the display device to display a spin of at least the first reel, the second reel, and the third reel of the reel set of the electronic game;
- cause the display device to display a stopping of spinning of the first reel and the second reel, wherein the stopping position of the first reel and the second reel are determined based at least in part on a respective random number generator call, and wherein a subset of symbols of the first reel and the second reel are displayed based on the determined stopping position of the first reel and the second reel;
- after the first reel and the second reel stop spinning and prior to stopping spinning of the third reel, in response to determining that at least one feature symbol appears on the displayed subset of symbols of each of the first reel and the second reel, parse the third reel to identify the one or more marked positions based on the one or more marked positions including a symbol identifier having the designated tag;
- identify, by selecting only from the identified one or more marked positions including the symbol identifier having the designated tag, one or more positions of the third reel in which to place an overlay symbol based on an random number generator outcome;

modify at least the third reel of the reel set to place a respective one of one or more overlay symbols in the identified one or more positions, wherein each overlay symbol of the one or more overlay symbols includes a prize identifier;

cause the display device to display a stopping of the spinning of the third reel of the reel set to display the one or more overlay symbols including the prize identifier, wherein the stopping position of the third reel is determined based at least in part on another random number generator call, and wherein a subset of symbols of the third reel is displayed based on the determined stopping position of the third reel and includes the one or more overlay symbols;

evaluate an outcome of the spin based on the displayed subset of the first reel, the second reel, and the third reel that includes the one or more overlay symbols with an associated prize identifier; and award a prize indicated by the prize identifier based on the evaluation.

16. The non-transitory computer-readable storage media of claim 15, wherein the instructions further cause the game controller to dynamically add the prize identifiers to each overlay symbol based on an output of the random number generator.

17. The non-transitory computer-readable storage media of claim 15, wherein each overlay symbol includes a static prize identifier.

18. The non-transitory computer-readable storage media of claim 15, wherein the instructions further cause the game controller to:

select one or more reels from a plurality of reels of the reel set including the third reel for an overlay feature; and add the one or more overlay symbols to the selected reels.

19. The non-transitory computer-readable storage media of claim 15, wherein each reel of the reel set includes a first set of non-feature symbols and a second set of non-feature symbols that does not overlap with the first set of non-feature symbols, wherein symbols adjacent to feature symbols on the first reel are from the first set of non-feature symbols, and wherein symbols adjacent to feature symbols on the second reel are from the second set of non-feature symbols.

20. The non-transitory computer-readable storage media of claim 15, wherein the instructions further cause the game controller to display a metamorphic feature animation during the spin, thereby visually identifying that the third reel is being modified to include the one or more overlay symbols.

* * * * *